US012621433B2

(12) United States Patent
Johar

(10) Patent No.: US 12,621,433 B2
(45) Date of Patent: May 5, 2026

(54) PREDICTION-BASED EXTRAPOLATION OF PIXELS FOR IMPROVED VIDEO COMPRESSION

(71) Applicant: Xilinx, Inc., San Jose, CA (US)

(72) Inventor: Sumit Johar, Hyperabad (IN)

(73) Assignee: Xilinx, Inc., San Jose, CA (US)

( * ) Notice: Subject to any disclaimer, the term of this patent is extended or adjusted under 35 U.S.C. 154(b) by 146 days.

(21) Appl. No.: 18/391,646

(22) Filed: Dec. 20, 2023

(65) Prior Publication Data

US 2025/0211726 A1 Jun. 26, 2025

(51) Int. Cl.
| | |
|---|---|
| *H04N 7/12* | (2006.01) |
| *H04N 19/105* | (2014.01) |
| *H04N 19/132* | (2014.01) |
| *H04N 19/136* | (2014.01) |
| *H04N 19/159* | (2014.01) |
| *H04N 19/182* | (2014.01) |
| *H04N 19/593* | (2014.01) |

(52) U.S. Cl.
CPC ......... *H04N 19/105* (2014.11); *H04N 19/132* (2014.11); *H04N 19/136* (2014.11); *H04N 19/159* (2014.11); *H04N 19/182* (2014.11); *H04N 19/593* (2014.11)

(58) Field of Classification Search
CPC .................................................. H04N 19/105
See application file for complete search history.

(56) References Cited

U.S. PATENT DOCUMENTS

2016/0381383 A1* 12/2016 Oh .......................... H04N 19/52
375/240.16

OTHER PUBLICATIONS

Y. Chen, J. Han and K. Rose, "A recursive extrapolation approach to intra prediction in video coding," 2013 IEEE International Conference on Acoustics, Speech and Signal Processing, Vancouver, BC, Canada, 2013, pp. 1734-1738, doi: 10.1109/ICASSP.2013.6637949.

H. Chen, T. Zhang, M.-T. Sun, A. Saxena and M. Budagavi, "Improving Intra Prediction in High-Efficiency Video Coding," in IEEE Transactions on Image Processing, vol. 25, No. 8, pp. 3671-3682, Aug. 2016, doi: 10.1109/TIP.2016.2573585.

J. Li, B. Li, J. Xu and R. Xiong, "Efficient Multiple-Line-Based Intra Prediction for HEVC," in IEEE Transactions on Circuits and Systems for Video Technology, vol. 28, No. 4, pp. 947-957, Apr. 2018, doi: 10.1109/TCSVT.2016.2633377.

(Continued)

*Primary Examiner* — Y Lee
(74) *Attorney, Agent, or Firm* — Kowert, Hood, Munyon, Rankin & Goetzel, P.C.; Rory D. Rankin

(57) ABSTRACT

Methods and systems for generating missing reference pixels for intra prediction of coding units are described. A pattern amongst a plurality of available reference pixel samples from a set of reference pixel samples is computed. The pattern can be determined based on a computed difference between actual pixel values of the available reference pixel samples. The patterns are learned based on a comparison of the computed difference between the actual pixel values to a predetermined threshold. The unavailable pixel values are then generated based on the learned pattern. Further, one or more image effects corresponding to the available reference pixel samples are automatically replicated in the generated pixels as well.

20 Claims, 7 Drawing Sheets

(56)  References Cited

OTHER PUBLICATIONS

T. Wiegand, G. J. Sullivan, G. Bjontegaard and A. Luthra, "Overview of the H.264/AVC video coding standard," in IEEE Transactions on Circuits and Systems for Video Technology, vol. 13, No. 7, pp. 560-576, Jul. 2003, doi: 10.1109/TCSVT.2003.815165.

J. Lainema, F. Bossen, W.-J. Han, J. Min and K. Ugur, "Intra Coding of the HEVC Standard," in IEEE Transactions on Circuits and Systems for Video Technology, vol. 22, No. 12, pp. 1792-1801, Dec. 2012, doi: 10.1109/TCSVT.2012.2221525.

P. de Rivaz and J. Haughton, "Av1 bitstream & decoding process specification." [Online]. Available: https://aomediacodec.github.io/av1-spec/av1-spec.pdf.

J. Pfaff et al., "Intra Prediction and Mode Coding in VVC," in IEEE Transactions on Circuits and Systems for Video Technology, vol. 31, No. 10, pp. 3834-3847, Oct. 2021, doi: 10.1109/TCSVT.2021.3072430.

* cited by examiner

PREDICTION-BASED EXTRAPOLATION OF PIXELS FOR IMPROVED VIDEO COMPRESSION

BACKGROUND

Description of the Related Art

Digital video functionalities can be integrated into a wide array of devices, including digital televisions, digital direct broadcast systems, wireless broadcast systems, personal digital assistants (PDAs), laptop or desktop computers, digital cameras, and similar gadgets. These digital video devices make use of video encoding methods, as outlined in the standards set by MPEG-2, MPEG-4, ITU-T H.263, ITU-T H.264/MPEG-4, Part 10, Advanced Video Coding (AVC), the High Efficiency Video Coding (HEVC) standard, and extensions of these standards. By incorporating such video encoding techniques, these devices can transmit, receive, encode, decode, and/or store digital video content in a more efficient manner.

Video coding methods include spatial (intra-picture) prediction and/or temporal (inter-picture) prediction to diminish or eliminate the repetitiveness found in video sequences. In the context of block-based video coding, a video segment (for instance, a video frame or a segment of a video frame) can be divided into video units, which might also be denoted as tree blocks, coding units (CUs), or coding blocks.

Spatial or temporal prediction produces a predictive block that serves as a basis for encoding a target block. The residual data represents the variations in pixel values between the original block and the predictive block. To enhance compression, the residual data can undergo a transformation from the pixel domain to a transform domain, yielding residual transformation coefficients that can subsequently be subjected to quantization. To achieve additional compression, entropy coding techniques may be employed.

Intra Prediction helps in video compression by exploiting spatial correlation between the pixels within a frame. It generates predicting pixels for a coding unit from the boundary pixels belonging to one or more of its neighboring blocks (e.g., top, left, top-left, etc.). Further, intra prediction can be performed in multiple modes to generate predicted pixels, such as Direct Current (DC) Mode, Angular Modes, etc. supported by different video compression standards. When these neighboring blocks are not available, those pixels are substituted with the last available pixel. However, this may be a sub-optimal way of generating such pixels, since merely replicating unavailable pixels with available pixels does not consider the relationship between the available pixels, e.g., existing patterns such as fading or shadows.

Therefore, there exists a need for an improved pixel prediction for intra prediction in coding units.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
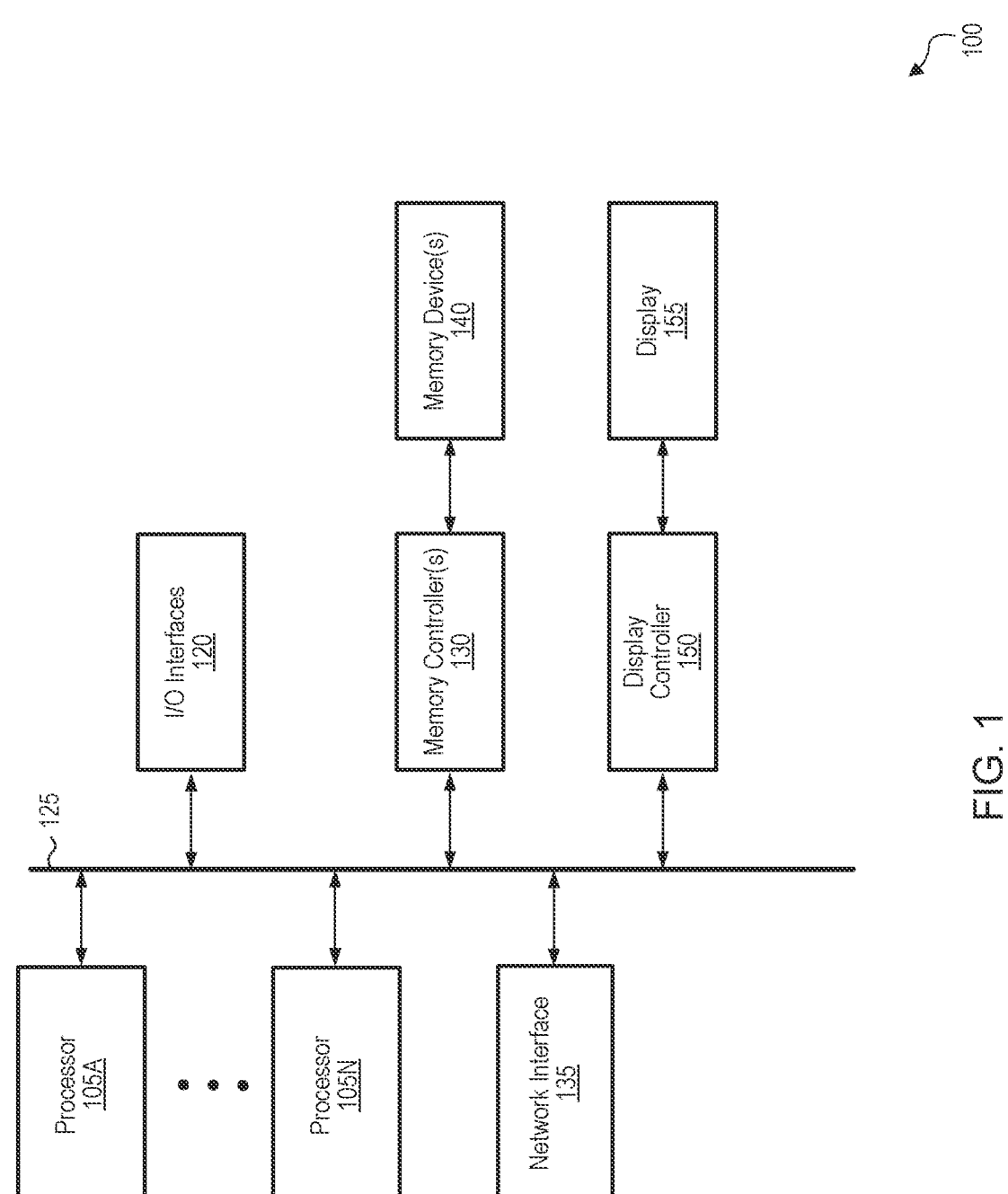
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for generating missing pixel values for intra prediction are disclosed. When reconstructing a block that has undergone intra prediction, the decoding process involves creating a prediction block by utilizing neighboring pixels from the same block. This prediction block is then combined with the residual signal that was sent by the encoding process. To generate a prediction sample for the current block based on the chosen prediction mode, it is necessary to obtain reference samples from the neighboring pixels. In situations where certain neighboring reference pixel samples of the current block remain un-decoded or are otherwise unavailable, the decoder can adapt by estimating these missing reference samples through replication of pixels from available data. Specifically, the decoder can generate a pixel that is yet to be decoded or is unavailable using the most recent available sample, e.g., by updating it based on an available reference sample transitioning from the bottom-left sample to the top-right reference sample (i.e., available reference samples from neighboring coding blocks).

The replication of pixels to generate unavailable pixels is currently followed by all the latest video compression standards including H.264, HEVC, AV1, VVC, and the like. However, merely replicating pixels is not optimal, because this disregards patterns within a frame like shading or smooth transitions. By repeating the last pixels these patterns get broken, e.g., in case of a fading effect from bright to dark (where value of pixels is decreasing), replicating the last pixel can imply that the pattern beyond available pixels is assumed to be constant, which does not represent the actual image.

To this end, techniques are proposed herein, using which pixels beyond the available pixels are not merely copies of last available pixels, but are computed using extrapolation. The extrapolation is performed based on actual computed differences between available pixels from neighboring blocks. Further, these differences are compared against predefined thresholds in order to ascertain a strength of existing patterns between the available pixels. Such extrapolation of pixels exploits the existing patterns between available pixels, for example, if a fade pattern is present in the available pixels, it will be present in the extrapolated pixels as well. Consequently, more accurate image formation and better video compression can be achieved. These and other implementations are discussed.

As described herein, in the context of video coding and compression, a "coding unit" (CU) (or coding block or simply "block") is a fundamental unit used in video coding standards like H.265 (HEVC), and AV1. It represents a block or portion of a frame or picture. Coding Units are used to divide the video frames into smaller segments, allowing for efficient compression and coding of video data. The size and shape of coding units can vary, and they can be square or rectangular. Further, a "coding tree unit" (CTU) is a hierarchical structure that organizes coding units within a frame. It represents the partitioning of a frame into smaller coding units. In one implementation, the frame is divided into CTU blocks of 64×64 or 128×128 pixels (as allowed by the video compression standard), and these CTUs are hierarchically divided into smaller CUs. This hierarchical structure allows for adaptively selecting the appropriate CU size for different regions of the frame, which helps improve compression efficiency by fragmenting complex content into smaller blocks and simpler content into larger blocks.

In various implementations described herein, "intra prediction" is a technique used in video coding to reduce redundancy in video frames by predicting the values of pixel blocks within a CU based on neighboring pixel values. This prediction is performed within the same frame or picture, to exploit spatial correlations in the video content. In intra prediction, a prediction mode is selected for each coding unit or block, and the pixel values within that block are predicted based on neighboring pixels. The prediction modes can include methods like Direct Current (DC) prediction, planar prediction, directional prediction, and angular mode prediction. The difference (residual) between the predicted values and the actual pixel values can be encoded and transmitted, which results in data compression.

Referring now to FIG. 1, a block diagram of one implementation of a computing system 100 is shown. In an implementation, computing system 100 is configured to, amongst other functionalities, process data, such that but not limiting to, unprocessed image data received from one or more imaging devices, such as a camera. The system 100 is configured to identify pixels in a raw image pattern and process the raw image pattern to create display-ready images. Additionally, the system 100 is configured to process data pertaining to static images and dynamic images (like videos) for a diverse range of camera-enabled devices, such as digital cameras, electronic devices with built-in digital cameras (e.g., mobile devices and laptop computers), security or video surveillance setups, medical imaging systems, and other devices operating in similar contexts.

In one or more implementations, the system 100 encompasses a video coding system which implements intra prediction involving techniques for encoding video data by predicting values of pixels within a video block or frame. This prediction is based on the analysis of neighboring pixels or blocks within the same frame, without reference to external frames or images. The system 100 employs various intra prediction modes, e.g., DC mode, planar mode, angular modes, etc. to estimate pixel values. In the context of angular modes, the system 100 can utilize algorithms that take into account the spatial orientation and texture characteristics of the block being predicted. These angular modes enable the system 100 to make more precise predictions and reduce redundancy in video data. In an implementation, intra prediction, specifically using angular modes as described in context of the present disclosure, leads to enhanced video compression capabilities and improved efficiency in data transmission and storage. These and other implementations are explained in detail with respect to subsequent FIGS. 5-7.

In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100. In several implementations, one or more of processors 105A-N are configured to execute a plurality of instructions to perform functions as described with respect to FIGS. 4-6 herein.

In one implementation, processor 105A is a general-purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
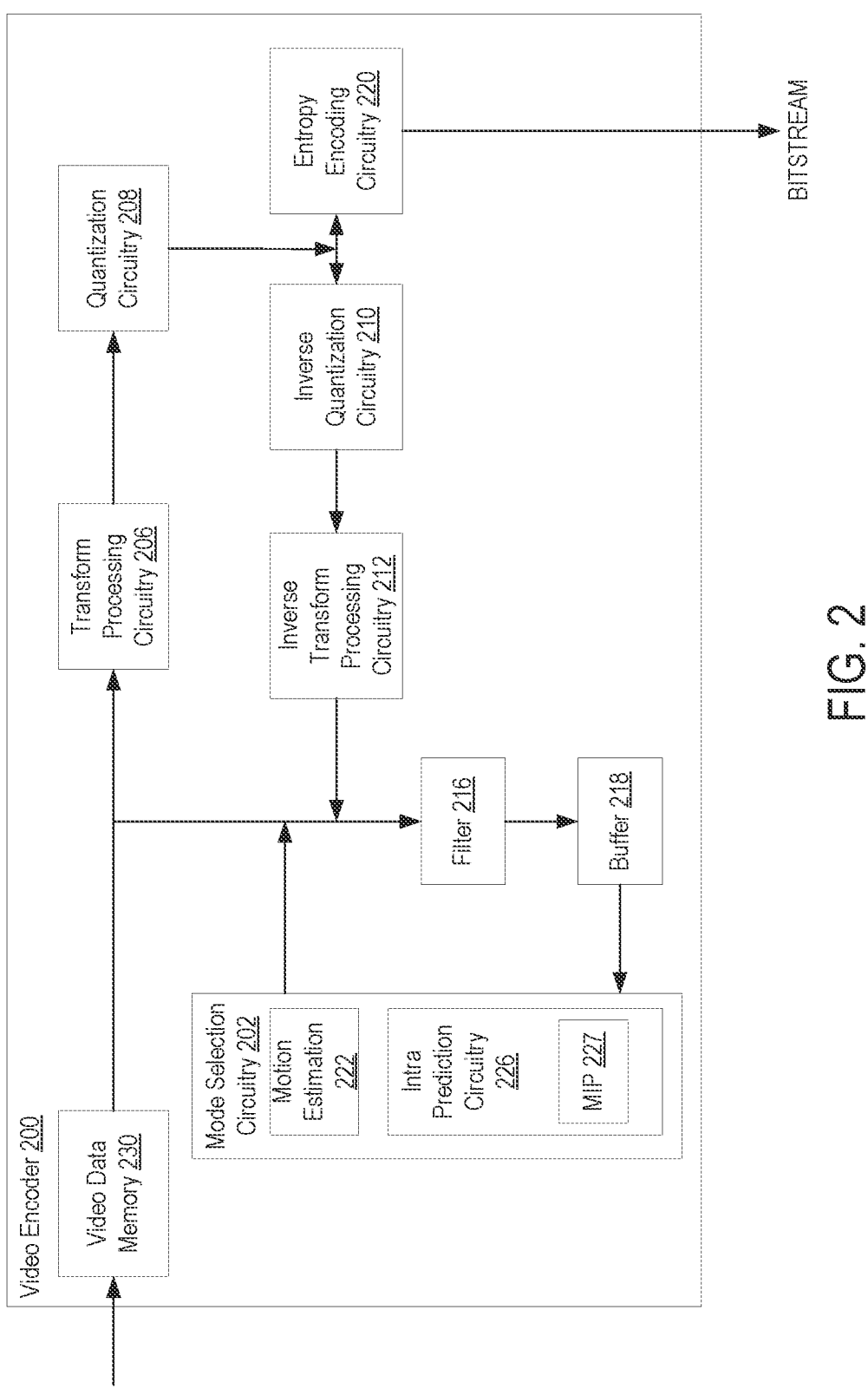
FIG. 2 illustrates a schematic representation of a video encoder.

FIG. 2 depicts a schematic representation of a video encoder 200. It is noted that the illustration in FIG. 2 is for explanatory purposes and should not be seen as restricting the broader techniques exemplified and discussed in this disclosure. The disclosure, in its explanation, discusses video encoder 200 within the context of video coding standards like HEVC.

The video encoder 200 comprises various components, including video data memory 230, mode selection circuitry 202, transform processing circuitry 206, quantization circuitry 208, inverse quantization circuitry 210, inverse transform processing circuitry 212, filter circuitry 216, decoded picture buffer (DPB) 218, and entropy encoding circuitry 220. Any of these components can be implemented within one or more processors or processing circuitry. Additionally, video encoder 200 may incorporate alternative processors or processing circuitry to carry out these functions. For example, as shown, the intra-prediction circuitry 226 may feature a MIP circuitry 227.

Within this document, "video data memory 230," should not be construed as exclusively referring to memory that is either contained within the video encoder 200 (unless explicitly specified) or external to the video encoder 200 (again, unless specifically mentioned). Instead, video data memory 230 is meant to encompass memory used for storing video data that the video encoder 200 receives for the purpose of encoding, such as video data associated with the current block undergoing encoding.

Video data memory 230 is configured to store incoming video data. Video encoder 200 can access a frame of this video data and deliver it to both the residual generation circuitry 204 and the mode selection circuitry 202. The video data contained in video data memory 230 can include of unprocessed video data intended for encoding. Video encoder 200 has the capability to divide an image obtained from video data memory 230 into a sequence of Coding Tree Units (CTUs) and include one or more of these CTUs within a slice. The mode selection circuitry 202, in line with a hierarchical tree structure, like the QTBT structure or the quad-tree structure found in HEVC, can subdivide a CTU from the image. As mentioned previously, the video encoder 200 can create one or more Coding Units (CUs) by dividing a CTU based on this tree structure. Such a CU can also be commonly referred to as a 'coding block' or simply a 'block'.

Typically, the mode selection circuitry 202 manages its individual components, including motion estimation circuitry 222 and intra-prediction circuitry 226. These components collaborate to produce a prediction block for the current block, which could be the current CU or, in the case of HEVC, the overlapping section of a Prediction Unit (PU) and a Transform Unit (TU). In the context of intra-prediction involving predictions within the same frame, the intra-prediction circuitry 226 has the capability to create a prediction block using data from nearby areas around the current block. To illustrate, when employing directional modes, the intra-prediction circuitry 226 typically combines neighboring sample values mathematically and then fills the current block in the specified direction with these calculated values to form the prediction block. In another scenario, such as the DC mode, the intra-prediction circuitry 226 calculates the average value of neighboring samples relative to the current block and incorporates this resulting average for each sample within the prediction block.

The motion estimation circuitry 222 can create one or more motion vectors (MVs), which specify the locations of the reference blocks in the reference pictures in relation to the location of the current block in the current picture. MIP circuitry 227 utilizes a MIP mode for the production of a prediction block for the current block.

In an implementation, an unprocessed and non-encoded form of the current block from video data memory 230 and the prediction block from mode selection circuitry 202 is used to compute differences on a per-sample basis between the current block and the prediction block. These individual differences, sample by sample, establish a residual block associated with the current block. The transform processing circuitry 206 utilizes one or more transformations on the residual block to create a set of transform coefficients, referred to as a 'transform coefficient block.' The transform processing circuitry 206 has the flexibility to apply different types of transformations to the residual block in order to produce the transform coefficient block. Quantization circuitry 208 is capable of performing quantization on the transform coefficients within a transform coefficient block, resulting in the production of a quantized transform coefficient block. The inverse quantization circuitry 210 and inverse transform processing circuitry 212 can be employed to reverse the quantization process and apply inverse transformations to a quantized transform coefficient block. This procedure aims to reconstruct a residual block from the transform coefficient block.

The filter 216 has the capability to execute one or more filtering procedures on the reconstructed blocks. As an illustration, the filter 216 can carry out deblocking operations to mitigate blocked artifacts that may be present along the edges of coding units. The entropy encoding circuitry 220 is responsible for encoding syntax elements it receives from various functional components within the video encoder 200. For instance, it can perform entropy encoding on quantized transform coefficient blocks obtained from quantization circuitry 208. Additionally, the entropy encoding circuitry 220 can encode prediction-related syntax elements, such as motion data for inter-prediction or intra-mode information for intra-prediction, which are provided by the mode selection circuitry 202. The video encoder 200 can produce a bitstream that contains the entropy-encoded syntax elements required to rebuild slices or pictures, with the entropy encoding unit 220 being responsible for generating and outputting this bitstream, specifically.

In various implementations, video encoder 200 serves as an illustrative instance of a device designed for video data encoding. This device incorporates a memory for video data storage and employs one or more processors integrated into its circuitry, which are configured to execute any of the methods outlined in this disclosure. It is noted that even though one or more components of the video encoder 200 are disclosed as having specific hardware implementations, functionalities of these components can also be built in software.

Figure 3:
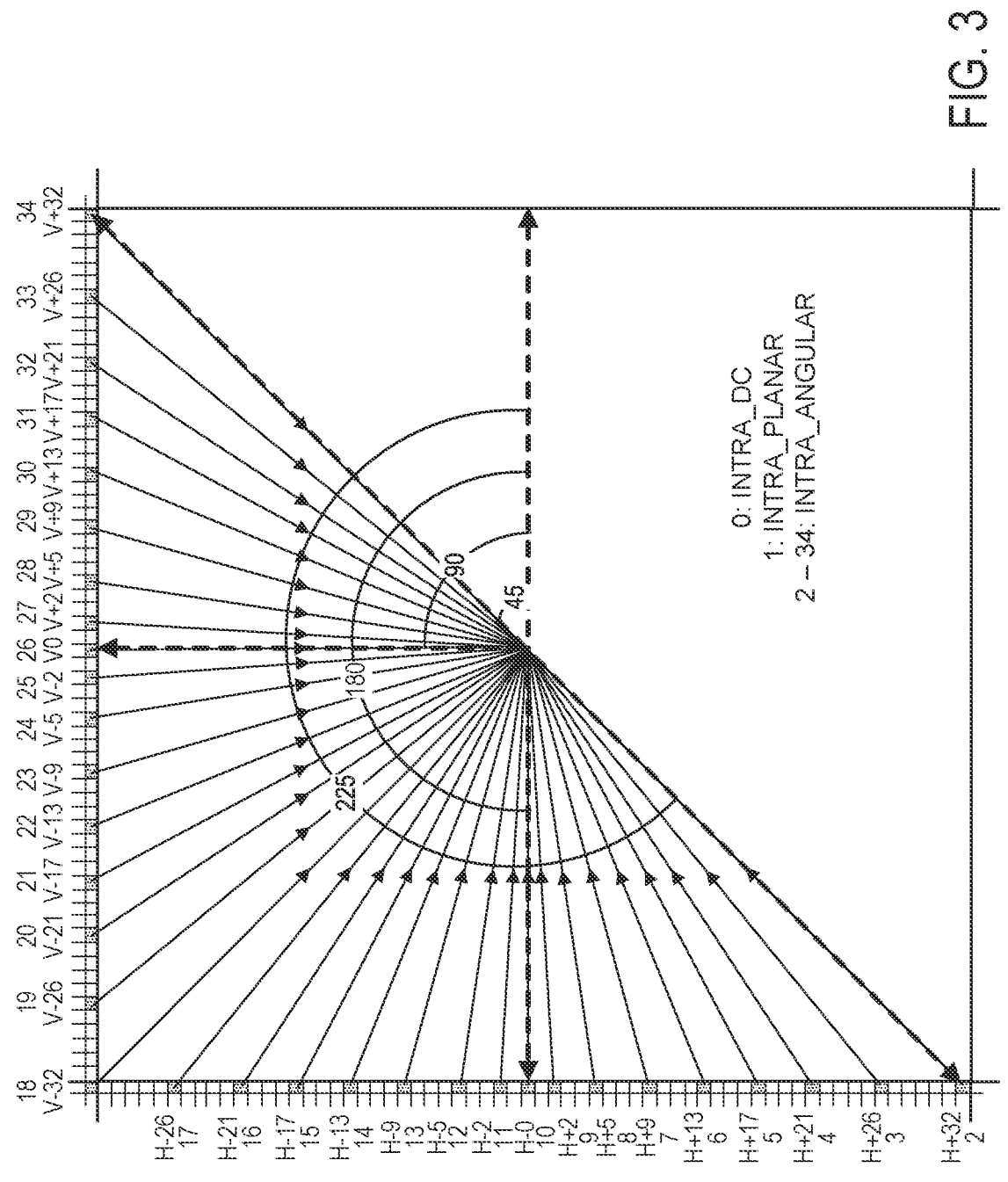
FIG. 3 is a conceptual illustration depicting a sample of intra prediction modes and their corresponding mode indices.

FIG. 3 provides a conceptual illustration depicting a sample of intra prediction modes and their corresponding mode indices. In the High Efficiency Video Coding (HEVC) standard, coding blocks, e.g., luma blocks, can be equipped with a total of 35 different intra prediction modes. These modes can include a planar mode, a DC mode, and 33 angular modes (referred to as angular intra prediction modes), all of which are represented in FIG. 3. These 35 intra prediction modes, as defined within the HEVC standard, are documented as below.

| | |
|---|---|
| 0 | INTRA_PLANAR |
| 1 | INTRA_DC |
| 2 . . . 34 | INTRA_ANGULAR |

In an implementation, in the planar mode, the prediction for pixel values within a coding unit is based on a planar model fitted to neighboring pixels of the coding unit. The prediction is achieved by estimating the pixel values within the coding unit as a linear combination of the neighboring pixel values. The model assumes that the pixel values change linearly across the coding unit. For instance, the predicted values represent a flat, uniform area where the pixel values transition smoothly from one side of the coding block to the other. Planar mode can be especially effective in regions with relatively smooth and gradual changes in brightness or intensity. In one example, a coding unit contains a grayscale image, and the neighboring pixels in the top and left rows having the following values:

Top Row: [100, 120, 140, 160]

Left Row: [80, 100, 120, 140]

Using the planar mode, the pixel values would be estimated within the coding unit as a linear combination of these neighboring values, resulting in a prediction that follows a smooth gradient. Other implementations are possible.

In the DC mode prediction, all pixel values within a coding unit are predicted with a single constant value, which is typically the average of the neighboring pixels. For the DC mode it is assumed that there is a uniform, constant brightness level within the coding unit. The DC mode is useful in regions with relatively uniform and constant intensity, such as flat areas in an image. Referring to an example, a coding unit comprises of a grayscale image, and the neighboring pixels have the following values:

Neighboring Pixels: [100, 100, 100, 100].

In the DC mode, all the pixel values within the coding unit would be predicted as 100, which is the average of the neighboring pixels. This mode is suitable for areas where the pixel values are nearly constant and do not exhibit significant changes in intensity.

In one or more implementations, HEVC further specifies 33 different prediction directions for its angular intra prediction modes, in addition to the DC mode and the planar mode (a total of 35 modes, wherein 0 denotes DC mode, 1 denotes planar mode, and 2 to 34 denote angular modes). For each given angular intra prediction, the intra prediction direction can be identified, for example, as shown in FIG. 3. In the example of FIG. 3, intra prediction mode 10 (denoted by H-0) corresponds to a pure horizontal prediction direction, and intra prediction mode 26 (denoted by V-0) corresponds to a pure vertical prediction direction. Each angular mode represents a particular direction for predicting pixel values within a coding unit.

For instance, "V−n" or "V+n" (or "H−n" and "H+n") refer to specific angular directions defined within the set of angular modes, wherein the "V" prefix denotes vertical prediction mode in the context of angular modes ("H" denoting horizontal prediction mode), and "n" denotes the mathematical value of the angle. For example, "V−2" may correspond to an angle that is 2 degrees from the vertical direction in a left direction, and "V+5" may correspond to an angle that is 5 degrees from the vertical direction in a right direction. These angles are used to determine the direction in which pixel values are predicted within the coding unit. Similar nomenclature can also be used for angular modes to the top and bottom of the horizontal prediction mode. In one or implementations, other angular mode predictors are possible.

In various implementations, the angular modes help predict coding blocks by projecting boundary pixels in different directions, e.g., ranging from 45-225 degrees as shown in FIG. 3, with an assumption that the pattern of variation along available pixels should be similar to the current block of pixels. There are some angles which can require pixels beyond top and left neighbors of a block, e.g., angles from 45-90 degrees can further require pixels from top-right blocks. Depending on the scanning index of a coding block, it is determined whether additional reference pixels from the neighboring blocks are available. For missing pixels, available pixels may be replicated, e.g., for the top-right missing pixel, the right most pixel of a top block is replicated and similarly, when left-bottom pixels are not available, bottom pixel of left neighboring block can be replicated (refer to FIG. 4).

The replication of pixels to generate unavailable pixels is currently followed by all the latest video compression standards including H.264, HEVC, AV1, VVC, and the like. However, merely replicating pixels is not optimal, because this disregards patterns within a frame like shading or smooth transitions that exists in both natural as well as synthetic contents. By repeating the last pixels (or disregarding modes referencing missing pixels) that pattern gets broken, e.g., in case of a fading effect from bright to dark (where value of pixels is decreasing), replicating the last pixel can imply that the pattern beyond available pixels is assumed to be constant, which does not represent the actual image.

To this end, techniques are proposed herein, using which pixels beyond the available pixels are not merely copies of last available pixels, but are computed using extrapolation. This exploits the existing pattern between available pixels, for example, if a fade pattern is present in the available pixels, it will be present in the extrapolated pixels as well. These and other implementations are explained in FIGS. 5-7.

Figure 4:
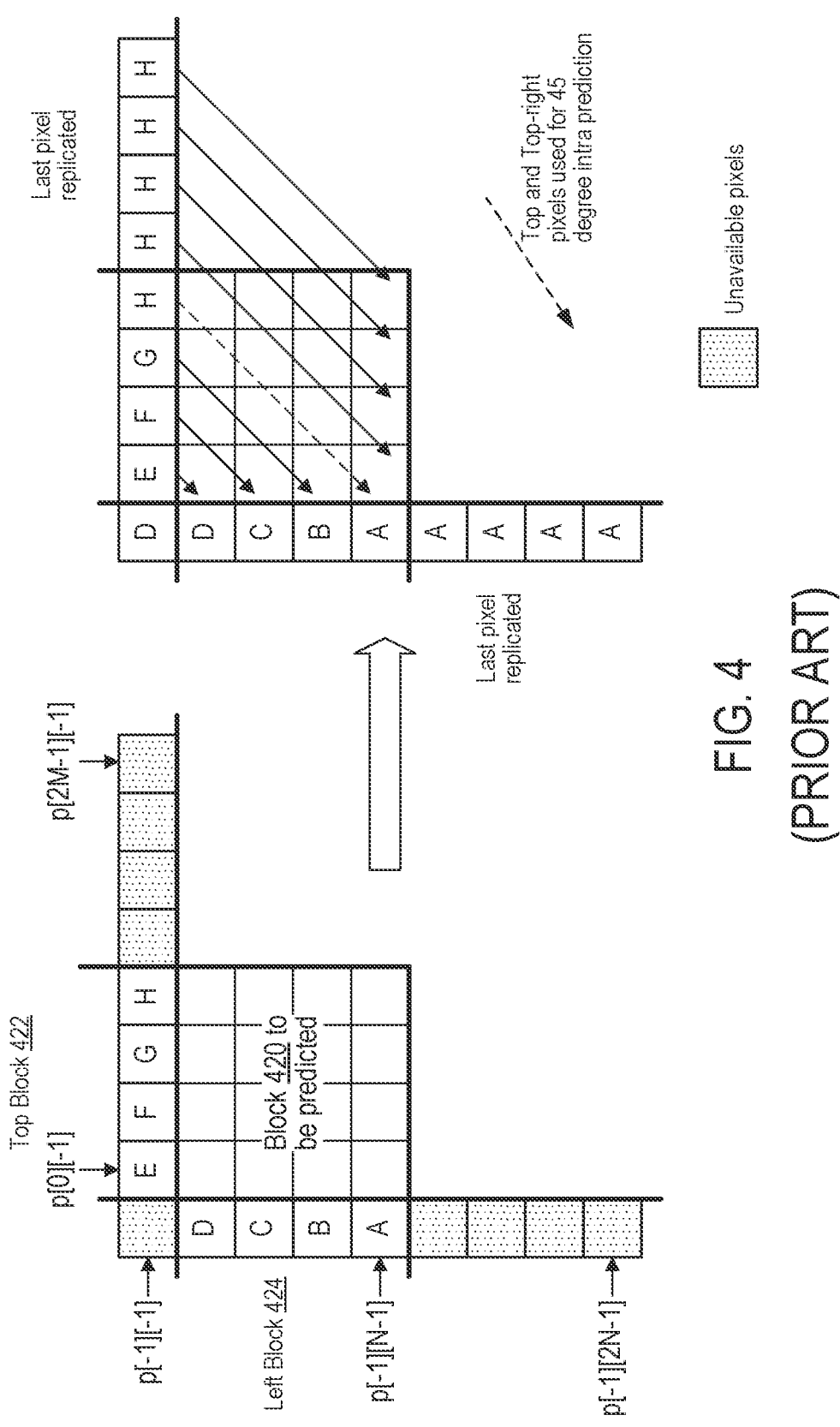
FIG. 4 is an example block diagram illustrating generation of unavailable pixels using reference pixels during intra prediction for a coding unit.

FIG. 4 depicts a block diagram illustrating generation of unavailable pixels using reference pixels during intra prediction for a coding block or unit. In an implementation, a decoder is configured to initiate an intra prediction mode for the current unit 420 based on prediction mode information generated by a predictor. According to the implementation, the decoder derives reference pixel samples of one or more neighboring coding units of the current coding unit 420 for predicting the coding unit 420.

In various implementations, when reconstructing a block that has undergone intra prediction, the decoding process involves creating a prediction block by utilizing neighboring pixels from the same block. This prediction block is then combined with the residual signal that was sent by the encoding process. To generate a prediction sample for the current block based on the chosen prediction mode, it is necessary to obtain reference samples from the neighboring pixels.

As an illustration, if the current block 420 has a size of N (herein size of block 420 is 4, since it is a 4×4 block, i.e., N=4), the largest possible reference area for intra prediction includes 2N (i.e., 8) pixels located directly above, 2N pixels positioned to the left, and also includes the pixel in the top-left corner. The decoder generates prediction samples within the current block 402 based on the intra prediction mode and the neighboring reference samples.

In an implementation, in situations where certain neighboring reference pixel samples of the current block remain un-decoded or are otherwise unavailable, the decoder can adapt by estimating these missing reference samples through replication of pixels from available data. Specifically, the decoder can generate a pixel that is yet to be decoded or is unavailable using the most recent available sample, e.g., by updating it based on an available reference sample transitioning from the bottom-left sample to the top-right reference sample.

In a specific example, as illustrated in FIG. 4, neighboring reference samples can be identified for the intra prediction of a current block 420. These neighboring samples include those to the left, such as p[−1][2N−1] and p[−1][N−1], the top-left, i.e., p[−1][−1], and the top neighboring samples p[0][−1], and so forth up to p[2M−1][−1]. In this context, p[x][y] represents a pixel sample at a particular position (x, y), with reference to the top-left sample position of the current block as (0, 0). Furthermore, N and M correspond to the width and height of the current block 420, respectively.

In one implementation, if one of the neighboring samples, like p[−1][2N−1], . . . , p[−1][−1], . . . , p[2M−1][−1], is not available for intra prediction, it can be replaced with an available sample using a substitution or padding method. In such a scenario, the missing sample can be substituted or padded with another neighboring sample that is adjacent to it. For instance, if a neighboring sample's position is beyond the boundaries of the current picture, slice, tile, or Coding Tree Unit (CTU) containing the current block, that particular reference sample is treated as unavailable. In a different scenario, other coding units that should contain the corresponding sample have not been encoded or decoded yet, that sample could be considered as unavailable.

The substitution or padding procedure described above can be performed in a given order. For example, when the neighboring sample p[−1][2N−1] is not accessible, a sequential search can be conducted from p[−1][2N−1] (or p[−1][2N−2]) to p[−1][−1], and then from p[0][−1] to p[2M−1][−1]. The first available neighboring sample encountered during this search can be assigned as the value for the neighboring sample p[−1][2N−1]. In a different case, a search can be performed sequentially starting from x=−1 and y=2N−2 and ending at x=−1 and y=−1. If the sample p[x][y] is missing, it can be replaced with the value of p[x][y−1]. In another scenario, a search can be sequentially conducted from x=0 and y=−1 to x=2N−1 and y=−1. Should the pixel p[x][y] be unavailable, it can be substituted with the value of the neighboring pixel p[x−1][y].

As shown in FIG. 4, when pixels below pixel p[−1][N−1] (denoted by 'A') are unavailable, last available pixel can be searched and the missing pixels are replaced with this pixel. For instance, if the last available pixel is 'A', this pixel is replicated for all missing pixels, as shown. Similarly, for pixels unavailable at the top right of the coding block 420, last available pixel 'H' is replicated for all missing pixels. Other possibilities of replacing unavailable pixels with available pixels using the above methodologies can be possible.

In an implementation, the replication of unavailable with last available reference pixels can be sub-optimal in cases where a strong pattern exists between the pixels, e.g., fades. These fades can exist from black to white or white to black in luminance, or in chrominance. Simply replicating missing pixels with available ones, does not take into account the patterns between the pixels providing poor correlation between existing pixels. Further, due to greater residual between predicted and actual pixels, overall system efficiency can be hampered.

For example, usually patterns exist within a frame, e.g., shading, or smooth transitions, both in natural as well as synthetic contents. By replicating the last pixels, this pattern can get broken, e.g., in case of a fading effect from bright to dark (where value of pixels is decreasing). If the last available pixel is replicated, it may imply that the pattern beyond available pixels is assumed to be constant, however, this does not represent the actual image and therefore results in non-optimal prediction samples.

To this end, a method of extrapolation is proposed herein, which uses existing pattern between available reference pixels to generate non-available reference pixels. The reference pixels generated based on the proposed extrapolation automatically learns the patterns that exists between the available reference pixels and uses these patterns when generating unavailable pixels, thereby providing better correlation. The correlation between the available reference pixels and generated reference pixels also reduces the residual between the predicted and actual pixels during intra prediction, and improves the compression efficiency of videos. The extrapolation methodology to generate unavailable reference pixels is described in detail with regards to FIGS. 5-7.

Figure 5:
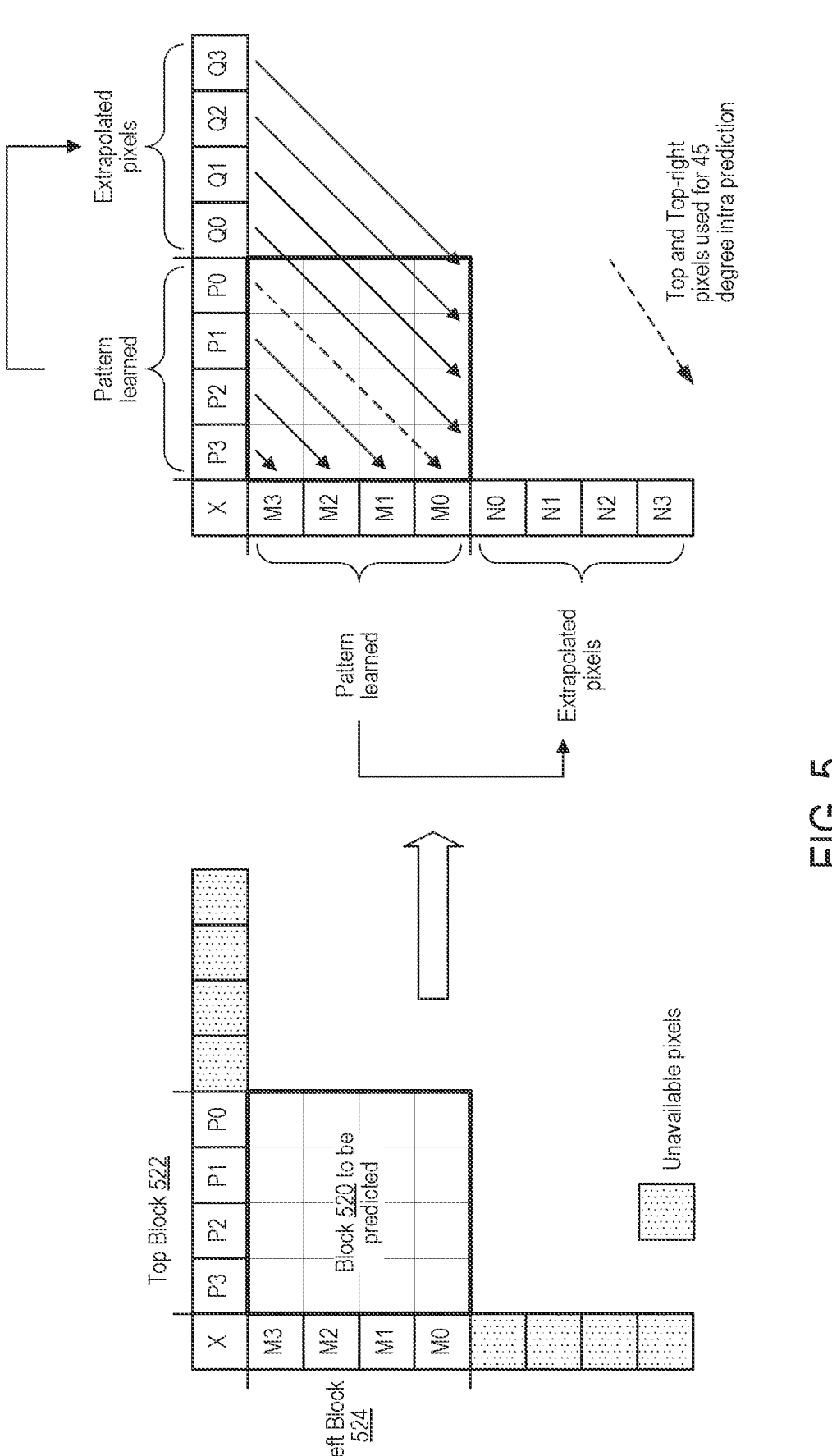
FIG. 5 illustrates an example block diagram showing extrapolation of unavailable pixels using available reference pixels, based on identified patterns between the available pixels.

FIG. 5 illustrates a block diagram showing extrapolation of unavailable pixels using available reference pixels, based on patterns between the available pixels. As described in the foregoing, intra prediction using angular modes is performed to predict coding blocks by projecting pixels in different directions. In the example shown in FIG. 3, these directions range from 45-225 degrees, with an assumption that variation along pixels is similar to the current block of pixels. In one implementation, some specific angles require pixels beyond top and left neighbors of the block for prediction. For instance, angles ranging from 45-90 degrees require pixels from top-right blocks. Further, depending on the scanning index of the coding block, when top-right pixels are missing, the right-most available pixel of the top block can be replicated, and similarly, when the left-bottom pixels are unavailable, the bottom boundary available pixel of the left neighboring block can be replicated (as shown in FIG. 4).

In various implementations, distinct patterns exist within a frame, e.g., fades, shading or smooth transitions, both in natural as well as synthetic contents. By replicating the last pixels, as described in the foregoing, these patterns can get broken, e.g., in case of a fading effect from bright to dark (where value of pixels is decreasing). For instance, when the last available pixel is replicated for an unavailable reference pixel, the pattern beyond available reference pixels is assumed to be constant, however, this does not represent the actual image and therefore can results in sub-optimal prediction samples.

In the implementations described herein, for a coding unit 520 to be predicted, the unavailable pixels are generated based on patterns learnt from available reference pixels. As shown, for the block 520, pixels P0-P3 from the top neighboring block 522 and pixels M0-M3 from the left neighboring block 524 are available. Further, cross-section pixel X is also available. In an implementation, for specific angular mode predictions for the block 520, one or more bottom-left pixels as well as top-right pixels can also be required, however, may be unavailable (as shown by shaded blocks).

When such pixels are unavailable, a predictor (e.g., intra prediction circuitry 226 described in FIG. 2) can extrapolate the pixels from available pixels, e.g., based on patterns found in the available pixels. In an implementation, for determining the patterns between the available pixels, computations corresponding to actual pixel values of the available pixels are performed by the predictor. For example, for generating pixel values for top right unavailable pixels, the predictor learns a pattern between actual values of pixels P0-P3. In an implementation, the predictor calculates a first delta (D1) between the pixel values P0 and P1, which is given by the following example sequence:

$$D_1 = P_0 - P_1$$

Similarly, the predictor calculates a second delta (D2) between the pixel values P1 and P2, and a third delta (D3) between the pixel values P2 and P3, which are given by the following example sequences:

$$D_2 = P_1 - P_2$$

$$D_3 = P_2 - P_3$$

In one implementation, a level of existing patterns between the available pixels P0 to P3, is also computed based on a comparison of the computed delta values to predetermined thresholds. For instance, a "strong" pattern is identified between the pixels, when the following condition is determined to be true:

if $(\text{sign}(D_1) = \text{sign}(D_2) = \text{sign}(D_3))$ AND $(\text{abs}(D_1 - D_2) < TH1)$ AND $(\text{abs}(D2 - D3) < TH2)$ That is, a strong pattern is determined between the pixel values P0-P3, when value of each of the deltas D1 to D3 has the same mathematical sign (i.e., positive or negative) and the absolute value of a difference between D1 and D2 is less than a first threshold, and the difference between D2 and D3 is less than a second threshold. Further, a "moderate" pattern is identified between the pixels, when the following condition is determined to be true:

ELSE if $(\text{sign}(D_1) = \text{sign}(D_2))$ AND $(\text{abs}(D_1 - D_2) < TH1)$ In other words, a moderate pattern is determined between the pixel values P0-P3, when value of delta D1 and D2 has the same mathematical sign (i.e., positive or negative) and the absolute value of a difference between D1 and D2 is less than a first threshold. Furthermore, a "weak" pattern is identified between the pixels, when the following condition is determined to be true:

ELSE if $(\text{sign}(D_1) = \text{sign}(D_2))$ AND $(\text{abs}(D_1 - D_2) < TH3)$ That is, a weak pattern is determined between the pixel values P0-P3, when value of delta D1 and D2 has the same mathematical sign (i.e., positive or negative) and the absolute value of a difference between D1 and D2 is less than a third threshold. Finally, if none of the above condition holds true, no pattern is identified between the pixels. In an implementation, the thresholds, T1, T2, and T3 are set as positive integers, e.g., TH1=10, TH2=10, and TH3=20. Other implementations are contemplated.

In an implementation, once it is determined whether a strong, moderate, weak, or no pattern is identified between the available pixels, the unavailable pixels can be generated accordingly. For instance, for a strong pattern between the available pixels P0 to P3, the unavailable pixels, e.g., Q0 to Q3, can be generated by computing an average value of Delta ($\Delta1$). In one example, the average value can be computed by averaging last three values of deltas. This average value of delta can be incrementally added to the values of available pixels to generate missing pixels. This is shown below by the following example sequences:

$$\Delta1 = \left\lfloor \frac{D1 + D2 + D3}{3} \right\rfloor$$

$$Q_0 = P_0 + \Delta1$$

$$Q_n = Q_{n-1} + \Delta1, \quad n = 1, 2, \ldots \ldots N - 1$$

In another implementation, for a moderate pattern identified between the available pixels P0 to P3, the unavailable pixels, e.g., Q0 to Q3, can be generated by computing a second average value of Delta ($\Delta2$). In one example, the average value can be computed by averaging last two values of deltas. This average value of delta can be incrementally added to the values of available pixels to generate missing pixels. This is shown below by the following example sequences:

$$\Delta2 = \left\lfloor \frac{D1 + D2}{2} \right\rfloor$$

$$Q_0 = P_0 + \Delta2$$

$$Q_n = Q_{n-1} + \Delta2, \quad n = 1, 2, \ldots \ldots N - 1$$

In yet another implementation, for a weak pattern identified between the available pixels P0 to P3, the unavailable pixels, e.g., Q0 to Q3, can be generated by computing an average value of last three available pixels and all missing pixels are substituted with this value. This is shown below by the following example sequences:

$$Q_n = \left\lfloor \frac{P_0 + P_1 + P_3}{3} \right\rfloor$$

$$n = 1, 2, \ldots \ldots N - 1$$

For no patterns identified between any of the pixel values of available pixels, all missing pixels are substituted with the last available pixel value. This is shown as below:

$$Q_n = P_0, \quad n = 1, 2, \ldots \ldots N - 1$$

In the example shown in FIG. 5, missing pixels shown by shaded blocks, can be assigned values based on the above methodology. For instance, the top-right missing pixels are assigned values Q0 to Q3 based on patterns learned between available pixels P0 to P3 (top available pixels). Similar computations can also be performed for bottom-left missing pixels, e.g., these may be assigned values (N0 to N3) based on the patterns learned between M0 to M3 (left available pixels). It is noted that even though a specific example of a 4×4 coding block is shown in FIG. 5, similar computations can also be performed for other block dimensions (e.g., 8×8 or 16×16 blocks) as well. These implementations are contemplated.

In an implementation, when generating missing pixel values based on patterns learned between available pixels, one or more effects (such as fades, shadings, etc.) are automatically replicated in the generated pixel values. This way, better angular intra predictors for frames with these effects can be generated. Further, better prediction thereby generates lesser residue and hence creates better video compression. Moreover, no extra memory requirements (such as extra line buffers) are needed to perform the above computations, since these computations utilize values of already available pixels. Consequently, no additional hardware area for video decoders (which are generally sensitive to area and performance) may be required.

Figure 6:
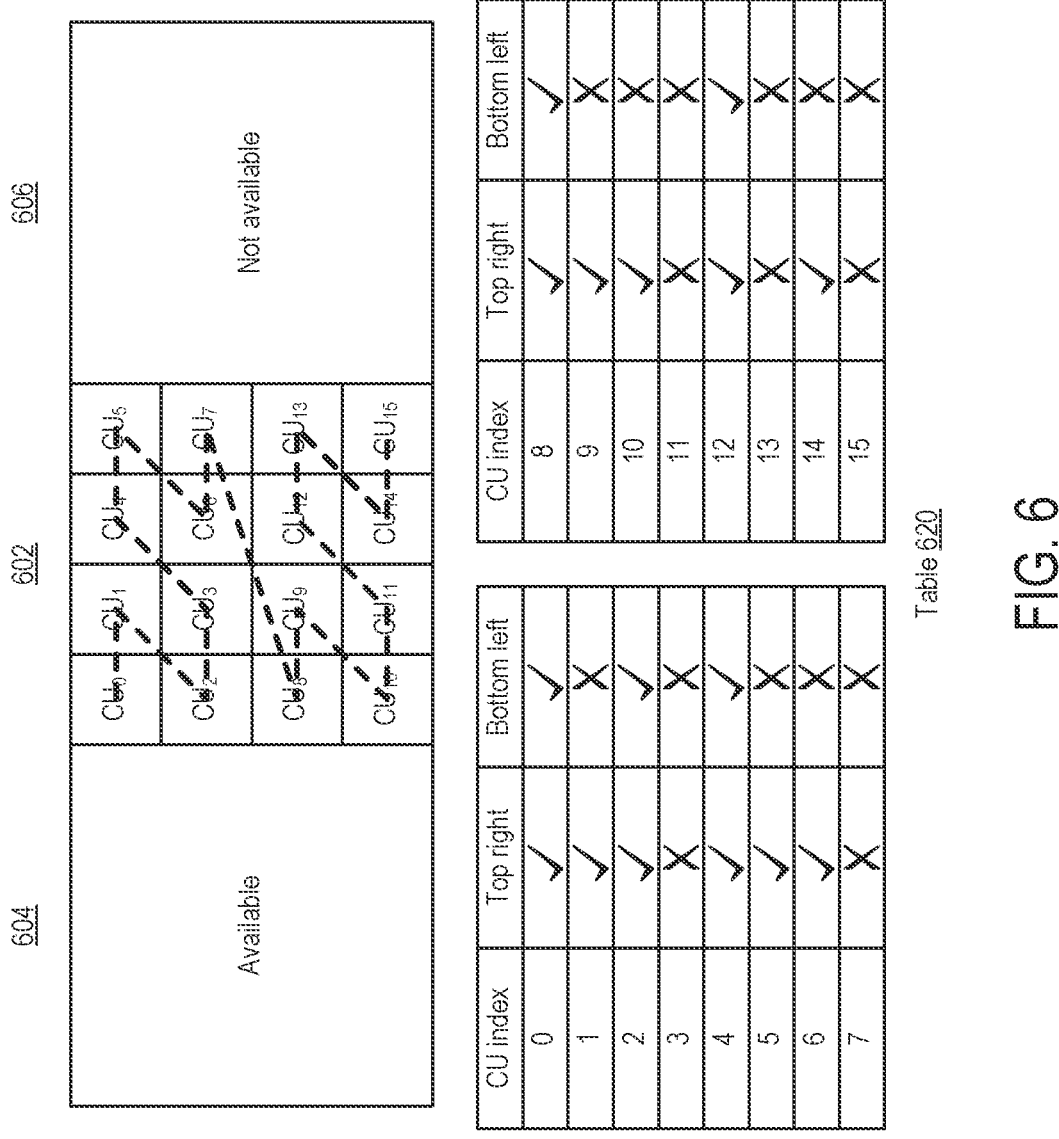
FIG. 6 illustrates an example lookup table indicating pixel availability determination.

FIG. 6 is a block diagram illustrating a lookup table indicating pixel availability determination. In an implementation, reference pixels corresponding to a neighboring coding block can be used to generate predictions for a current coding block. In the example shown in FIG. 6, coding tree unit (CTU) 602 is divided into 4×4 coding units (CU), given by CU0 to CU15 (i.e., 16 CUs in total). In an example, an intra prediction circuitry is configured to determine which neighboring pixels for each of the coding units (e.g., top-right or bottom-left) are available and which of these pixels are missing.

In an implementation, in HEVC (H.265) and similar video coding standards, the CTU is a fundamental unit used to divide a video frame for compression purposes. CTUs are organized hierarchically in a coding tree structure. Further, the coding units in the CTU are traversed using a "Z scanning" method. As shown in the figure, z scanning includes traversing the coding units using a zigzag path, which resembles the shape of the letter "Z," instead of processing the CUs row by row or column by column. Other scanning methods are possible and are contemplated.

In an implementation, for each CTU (e.g., CTU 602), neighboring CTUs may be available (processed, coded, and is ready for further processing or decoding) or unavailable (not yet encoded or compressed). For example, left neighboring CTU 604 is available and right neighboring CTU 606 is unavailable. Further, for each CU in the CTU 602, the intra prediction circuitry is configured to generate a lookup table 620, e.g., indicating which of the neighboring top-right and/or bottom-left reference pixels are available or missing (e.g., based on availability of neighboring CTUs).

As shown, the table 620 includes CU index of each CU, and an indication of whether the top-right or bottom-left reference pixels are available for any given CU. Based on this information, the circuitry can generate the missing pixels, using patterns learned from the available pixels (as described in FIG. 5). It is noted that availability reference pixels other than top-right or bottom-left pixels can also be included in the table 620.

Figure 7:
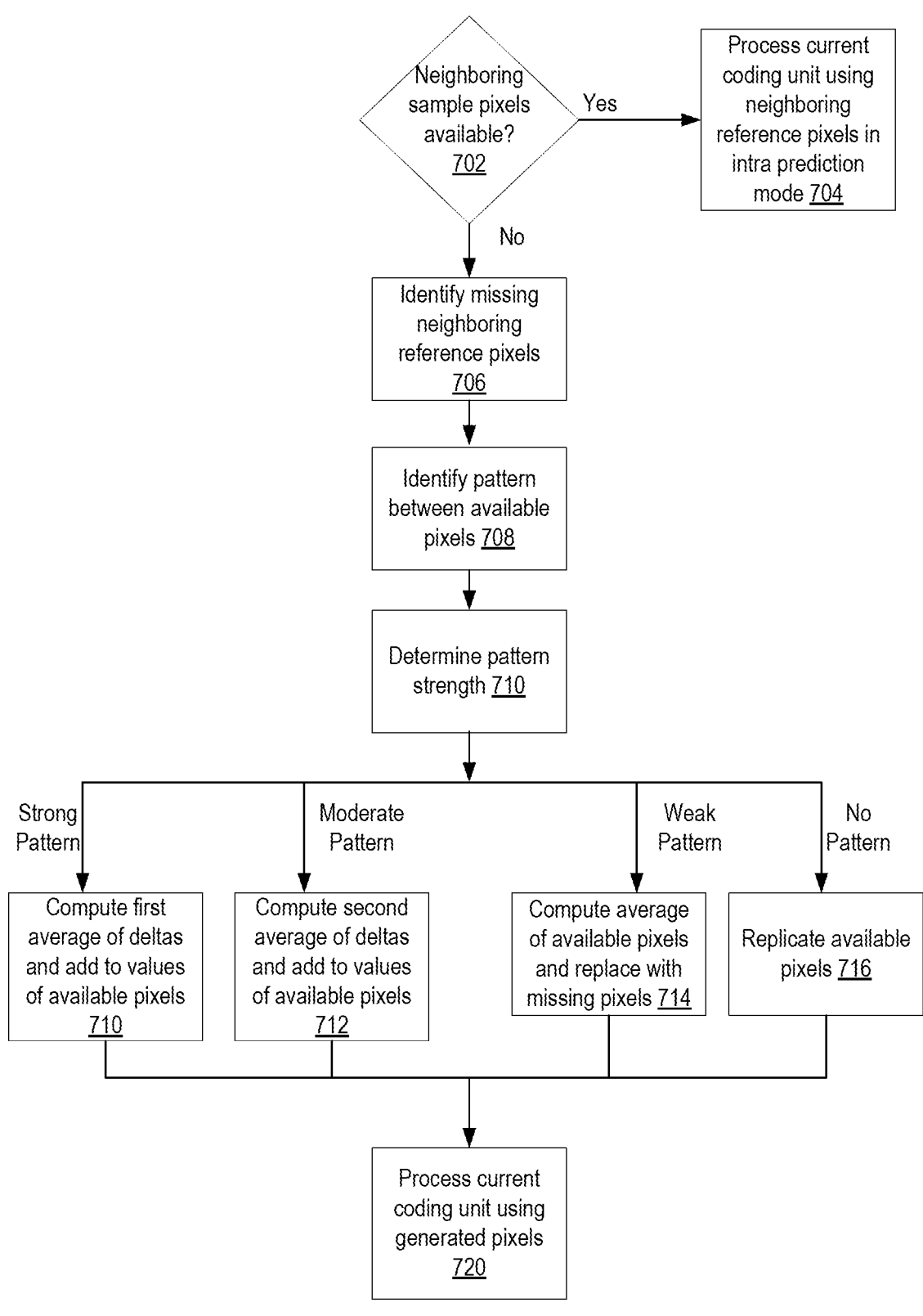
FIG. 7 illustrates an example method for generating missing reference pixel values based on available pixel values.

FIG. 7 illustrates an example method for generating missing reference pixel values based on available pixel values. As described in the foregoing, based on existing patterns between boundary reference pixels, non-available reference pixels are generated. The reference pixels generated based on the proposed extrapolation automatically infuses the same patterns that exists between the available reference pixels when generating unavailable pixels, thereby providing better correlation. Further, better correlation between the available reference pixels and generated reference pixels reduces the residual between the predicted and actual pixels during intra prediction, and improves the compression efficiency of videos.

In an implementation, an intra prediction circuitry creates a prediction block using data from nearby samples surrounding the current block. For example, when utilizing directional modes, the intra prediction circuitry employs operations to blend values from neighboring samples. It then populates the current block in the specified direction with these calculated values, resulting in the prediction block.

During processing a current coding unit, the intra prediction circuitry can first determine whether required neighboring sample pixels are available (conditional block 702). In an implementation, the neighboring sample pixels are associated with neighboring blocks in the same CTU or neighboring CTUs). If it is determined that neighboring sample pixels are available (conditional block 702, "yes" leg), the circuitry proceeds to process the current unit based on the neighboring pixel samples (block 704). However, when neighboring sample pixels are unavailable (conditional block 702, "no" leg), the intra prediction circuitry identifies which pixel samples are missing (block 706). In an implementation, this determination is made based on a lookup table comprising block index for each coding unit and identified missing neighboring sample pixels available and unavailable for each coding unit of a current coding tree unit (as described in FIG. 6).

Based on the identification of unavailable pixels, the circuitry determines a pattern between last available sample pixels for the current coding unit (block 708). In an implementation, the pattern is determined based on a comparison of differences between pixel values (deltas) of available pixel samples, with predetermined thresholds (as described in FIG. 5). The circuitry further determines a level of strength of pattern, e.g., strong pattern, moderate pattern, weak pattern, or no pattern is identified between the available sample pixels (block 710).

For a strong pattern identified between the available pixels, the unavailable pixels are generated by computing an average value of last three values of deltas (a delta is computed as a difference between pixel values of two successive pixels). This average value of delta can be incrementally added to the values of available pixels to generate unavailable pixels (block 712). Further, for a moderate pattern identified between the available pixels, the unavailable pixels are generated by computing another average value of deltas. In one example, the average value can be computed by averaging last two values of deltas. This average value of delta can be incrementally added to the values of available pixels to generate the missing pixels (block 714).

In an implementation, for a weak pattern identified between the available pixels, the unavailable pixels are generated by computing an average value of last three available pixels and all missing pixels are substituted with this value (block 716). For no patterns identified between any of the pixel values of available pixels, all missing pixels are substituted with the last available pixel value (block 718). Based on the generated pixel values of unavailable pixels, the circuitry performs intra prediction to predict the current coding unit (block 720).

It should be emphasized that the above-described implementations are non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
circuitry configured to:
    compute a pattern amongst a set of available reference pixel samples from a plurality of reference pixel samples; and
    generate pixel values for one or more unavailable reference pixel samples, based at least in part on the pattern.

2. The processor as claimed in claim 1, wherein the circuitry is configured to compute the pattern amongst the set of available reference pixel samples based at least in part on a computed difference between actual pixel values of the set of available reference pixel samples.

3. The processor as claimed in claim 2, wherein the pattern corresponds to at least one pattern type from a plurality of pattern types, and wherein the plurality of pattern types are learned at least based in part on comparison of the computed difference to a threshold.

4. The processor as claimed in claim 1, wherein the circuitry is configured to automatically replicate one or more image effects corresponding to the set of available reference pixel samples in the generated pixel values.

5. The processor as claimed in claim 1, wherein the one or more unavailable reference pixel samples correspond to a current coding unit of video data and the set of available reference pixel samples correspond to one or more neighboring coding units to the current coding unit.

6. The processor as claimed in claim 5, wherein the circuitry is configured to perform intra prediction for the current coding unit, based at least in part on the generated pixel values, using an angular intra prediction mode.

7. The processor as claimed in claim 6, wherein the circuitry is configured to encode the current coding unit of the video data based on the angular intra prediction mode.

8. A method comprising:
    computing, by a prediction circuitry, a pattern amongst a set of available reference pixel samples from a plurality of reference pixel samples; and
    generating, by the prediction circuitry, pixel values for one or more unavailable reference pixel samples, based at least in part on the pattern.

9. The method as claimed in claim 8, further comprising computing, by the prediction circuitry, the pattern amongst the set of available reference pixel samples based at least in part on a computed difference between actual pixel values of the set of available reference pixel samples.

10. The method as claimed in claim 9, wherein the pattern corresponds to at least one pattern type from a plurality of pattern types, and wherein the plurality of pattern types are learned at least based in part on comparison of the computed difference to a threshold.

11. The method as claimed in claim 8, further comprising automatically replicating, by the prediction circuitry, one or more image effects corresponding to the set of available reference pixel samples in the generated pixel values.

12. The method as claimed in claim 8, wherein the one or more unavailable reference pixel samples correspond to a current coding unit of video data and the set of available reference pixel samples correspond to one or more neighboring coding units to the current coding unit.

13. The method as claimed in claim 12, further comprising performing, by the prediction circuitry, intra prediction for the current coding unit, based at least in part on the generated pixel values, using an angular intra prediction mode.

14. The method as claimed in claim 13, further comprising encoding, by an encoding circuitry, the current coding unit of the video data based on the angular intra prediction mode.

15. A system comprising:
processing circuitry; and
encoding circuitry configured to:
    compute a pattern amongst a set of available reference pixel samples from a plurality of reference pixel samples; and
    generate pixel values for one or more unavailable reference pixel samples, based at least in part on the pattern.

16. The system as claimed in claim 15, wherein the encoding circuitry is configured to compute the pattern amongst the set of available reference pixel samples based at least in part on a computed difference between actual pixel values of the set of available reference pixel samples.

17. The system as claimed in claim 16, wherein the pattern corresponds to at least one pattern type from a plurality of pattern types, and wherein the plurality of pattern types are learned at least based in part on comparison of the computed difference to a threshold.

18. The system as claimed in claim 15, wherein the encoding circuitry is configured to automatically replicate one or more image effects corresponding to the set of available reference pixel samples in the generated pixel values.

19. The system as claimed in claim 15, wherein the one or more unavailable reference pixel samples correspond to a current coding unit of video data and the set of available reference pixel samples correspond to one or more neighboring coding units to the current coding unit.

20. The system as claimed in claim 19, wherein the encoding circuitry is configured to perform intra prediction for the current coding unit, based at least in part on the generated pixel values, using an angular intra prediction mode.

* * * * *